May 10, 1960 V. CIAMPOLINI 2,935,765
METHOD OF MAKING TUBULAR RUBBER LATEX ARTICLES BY
DEPOSITION ON AN INTERIOR MOLD SURFACE
Filed Oct. 24, 1955 5 Sheets-Sheet 1

INVENTOR
Valerio Ciampolini
BY
Stevens, Davis, Miller & Mosher
ATTORNEYS

May 10, 1960 V. CIAMPOLINI 2,935,765
METHOD OF MAKING TUBULAR RUBBER LATEX ARTICLES BY
DEPOSITION ON AN INTERIOR MOLD SURFACE
Filed Oct. 24, 1955 5 Sheets-Sheet 3

INVENTOR
*Valerio Ciampolini*

BY Stevens, Davis, Miller & Mosher
ATTORNEYS

United States Patent Office  2,935,765
Patented May 10, 1960

2,935,765

METHOD OF MAKING TUBULAR RUBBER LATEX ARTICLES BY DEPOSITION ON AN INTERIOR MOLD SURFACE

Valerio Ciampolini, Milan, Italy, assignor to Pirelli S.p.A., Milan, Italy

Application October 24, 1955, Serial No. 542,382

Claims priority, application Italy October 29, 1954

2 Claims. (Cl. 18—58)

The present invention relates to an improved method for the production of tubular articles from rubber latex and is particularly concerned with the manufacture of inner tubes for bicycle tires.

The generic expressions "tubes" and "latex" are used for convenience throughout the specification to refer more particularly to tubular articles and mixtures of latex respectively.

In the manufacture of tubes from liquid latex it is conventional practice to dip cylindrical cores or mandrels into a latex bath, remove them from the bath to dry the liquid coating deposited thereon and repeat this operation until a suitable thickness is produced. The annular tubes formed in this manner are then vulcanized while still on the cores, and are finally removed therefrom and dusted with talc inside and out.

This procedure, however, aside from the difficulty entailed in moving a series of cores through various steps of the manufacturing cycle and the high labor cost of such processing operations, is also objectionable owing to the formation of "skins" on the surface of the dipping tanks and the inclusion of air bubbles in the deposited coatings thereby weakening them in the areas where bubbles have occurred.

The present invention, besides providing a coordinated procedure for efficiently carrying out automatically and within a limited space all operations required for the production of latex tubes, thus reducing considerably the manufacturing costs and avoiding lengthy and expensive displacements of material as well as lost motion between the various phases of the cycle, also produces consistently formed products that are homogeneous and of controlled and predetermined thickness.

One object of this invention is achieved by periodically introducing latex into the cavity of hollow forms and withdrawing it from the forms while the latter remain stationary, and of effecting the drying of each layer of latex deposited on the inside surfaces of said forms by passing a current of hot air, or other gas, through the interior of the forms at a velocity to cause, without modifying the uniformity of the moist layer of latex, the rupture of any air bubbles that may have formed therein and a rapid and even drying of the deposited layer itself.

Another object of the invention is achieved by producing tubes having an even thickness throughout the entire length thereof. This is accomplished by performing half of the operations that are necessary for depositing latex on the inside surfaces of the forms when the latter are in their initial position and the other half of the operations when the forms are inverted with respect to their initial position due to a rotation of 180° about an axis normal to their symmetrical longitudinal axes.

Another object of the invention is achieved by carrying out the vulcanization of the tubes either by external heating of the forms or by directly blowing hot air or steam into the cavities thereof.

Another object of the invention is obtained by automatically applying talc to the inside of the tubes by means of an air current charged with talc, this being necessary to prevent the inner surfaces from adhering to each other.

Another object of the invention is attained by stripping and removing the completed tubes from the forms by simple traction applied to one of the ends thereof.

Another object of the invention is achieved by causing the tubes to be extended, outside of the forms, within a closed space or container wherein air charged with talc is circulated in order to apply talc to the external surfaces of the tubes.

The manner in which these and other objects and advantages of the invention are attained will be apparent from the following detailed description with reference to the accompanying drawings in which the equipment is illustrated more or less diagrammatically.

Figure 1:
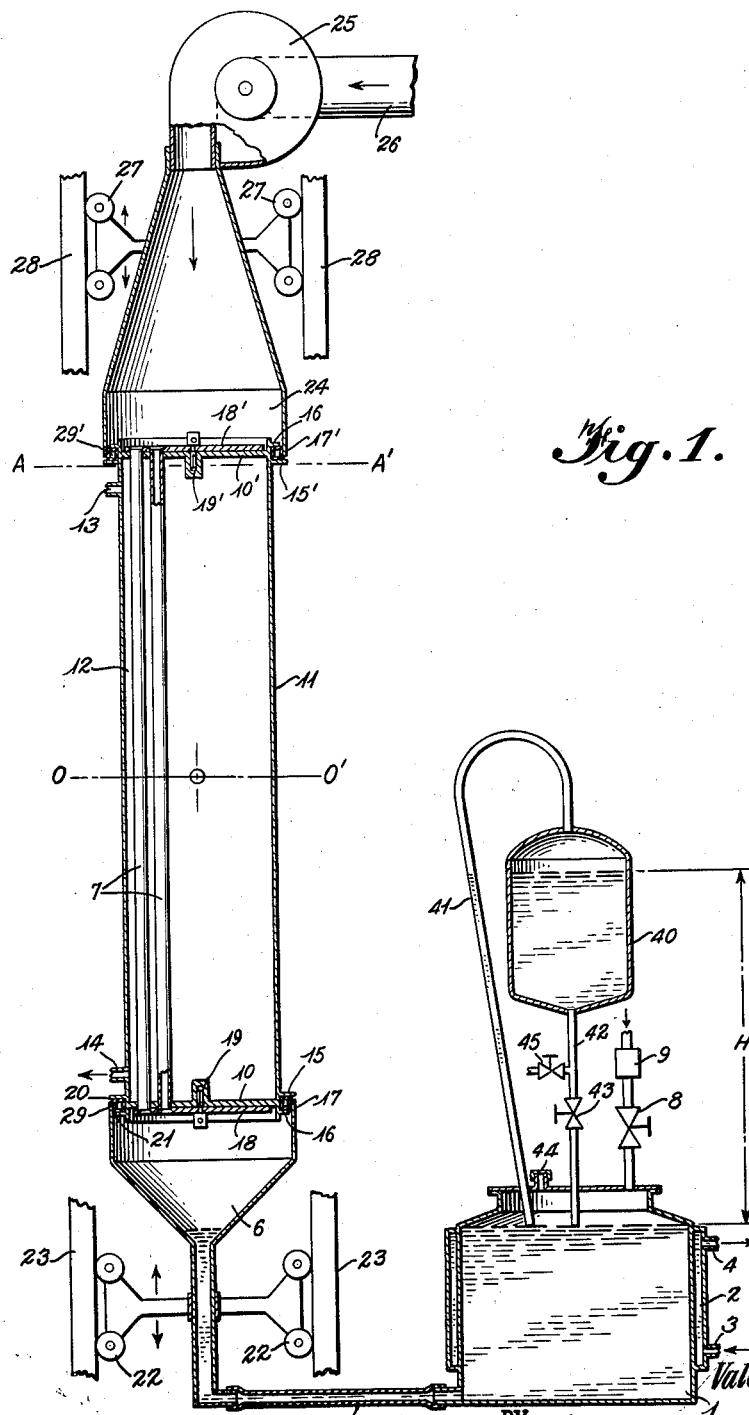
Fig. 1 represents a cross-sectional view in elevation through the bundle of tube forms, the latex feeding and distributing device, and the hot air blower.

According to the invention, the latex stored in a container is introduced into one or more hollow forms, while the latter remain stationary, and is thereafter discharged therefrom. The layer of latex left adhering to the interior surfaces of the forms is dried by passing a stream of hot air into the cavities thereof. The velocity of the air stream is controlled to prevent it from impairing the evenness of the deposited layers, but is such that the air stream is capable of breaking air bubbles that are formed in these layers. The operations just described are then repeated several times depending upon the thickness to be formed. The position of the forms, which is kept stationary as the above described operations are carried out, is reversed, however, after half of these operations have been completed in order to obtain products of uniform thickness. The tubes formed in this manner are now vulcanized, either by applying heat to the outside of the forms or by passing hot air or steam into the cavities thereof. This is followed by dusting the inside of the tubes by circulating air laden with talc through the interior thereof, and the outside of the tubes by elastically stretching and partially withdrawing them first from one end of the forms and then from the other end, in a closed space in which air laden with talc is circulated. The final and complete withdrawal from the forms is accomplished by applying traction at the end of the tubes.

The accompanying drawings show, by way of example, an apparatus suitable for carrying out the procedure mentioned above. It comprises a closed latex container 1 provided with a jacket 2 for the circulation of a fluid, such as cold water for conditioning the latex. The fluid is introduced through opening 3 and withdrawn through opening 4, as indicated by the arrows. Container 1 is connected by means of flexible pipe 5 to the funnel-shaped distributor 6 and to a series of tube forms 7 of which there are shown only two in Fig. 1, for the sake of simplicity. In its upper part, container 1 is connected through a three-way valve 8 to a source of compressed air via a relief valve 9 or to the outside atmosphere.

The tube forms 7 are mounted vertically and are assembled by means of terminal plates 10 and 10'. The bundle of tubes 7 is enclosed in a single casing 11 and is adapted to be rotated about a central horizontal axis O—O' which permits turning it upside down. The interior surface of casing 11 and the exterior surfaces of the tube forms define a space 12 for the circulation of a hot fluid introduced through opening 13 and discharged through opening 14. At points corresponding to each end of the casing 11 there are provided, at the exterior thereof, two flanges 15, 16 and 15', 16' defining two annular seats 17 and 17'.

On the two terminal plates 10 and 10' are juxtaposed two plates 18 and 18' which are perforated to receive the tubes and are fastened to plates 10 and 10' by means of coupling pins 19 and 19'. The latex distributor 6 may be raised until it engages the lower end of the tube bundle with a radial and frontal tolerance of a few millimeters thus forming slits 20 and 21, or lowered vertically by means of carriage 22 or other equivalent means capable of moving along guides 23.

A funnel-shaped blower 24 for the hot air connects to the other end of the tube bundle. It is associated with fan 25 drawing the hot air through tube 26 and is adapted to be moved closer or away from the upper part of the forms with the aid of a carriage 27, or equivalent means, capable of moving along guides 28.

Slits 20 and 21 may be hermetically closed by inflating the air tube 29 contained in the annular seat 17. In the upper part of the tube bundle, seat 17' is likewise provided with an inflatable air tube 29'.

Figure 2:
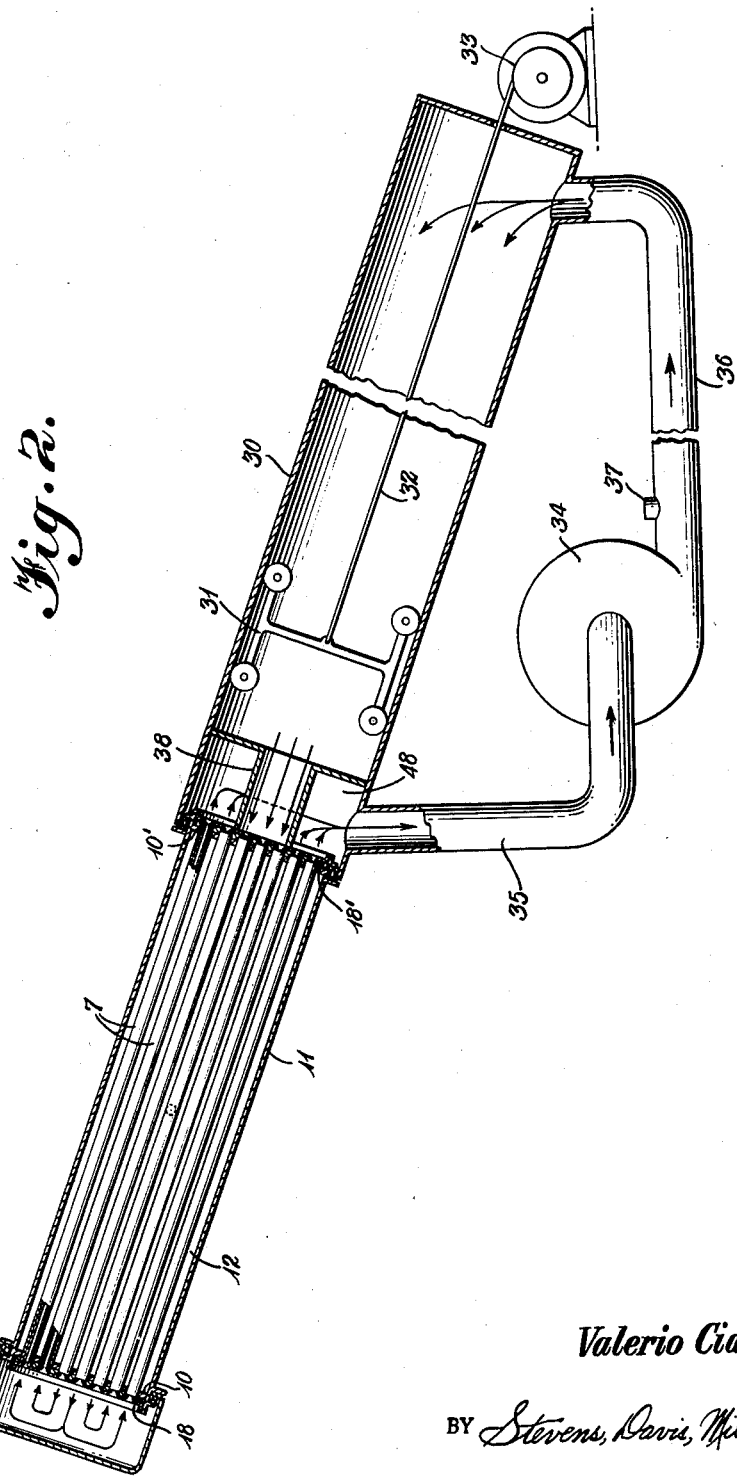
Fig. 2 shows a longitudinal section through the bundle of tube forms and the extracting-dusting device during the operation of dusting the inside surfaces of the tubes.
Figure 5:
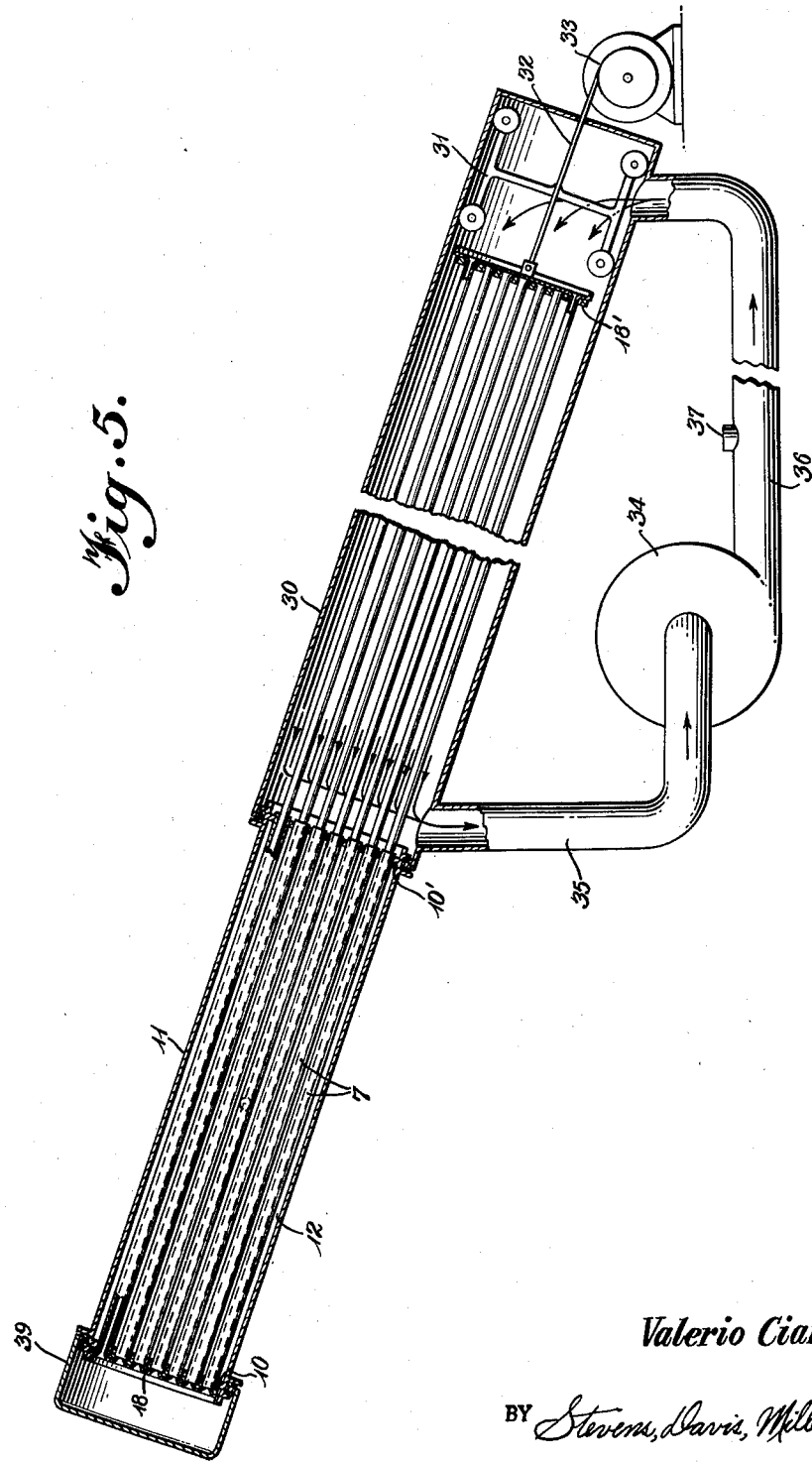
Fig. 5 shows in section the bundle of tube forms and the extracting-dusting device during the extracting and dusting operation outside of the tubes.

In Figures 2 and 5 there is additionally shown the equipment for dusting and removing the completed tubes from the forms. It consists of a tubular body 30, measuring approximately one and one-half times the length of the tube bundle, through which is moved a carriage 31 fastened to a steel cable 32 wound around winch 33 and serving to impart the necessary pulling or extracting force to the carriage 31. A fan 34 is connected to the tubular body 30 through pipes 35 and 36. The latter is provided with an inlet opening 37 for the talc.

A nozzle 38 and a cover 39 (Fig. 2) are additionally provided at the two ends of the tube bundle.

There is also shown in Fig. 1, a feeding device for the latex, although this is not indispensable in so far as the productive cycle of the equipment is concerned. It consists of a closed container or reservoir 40 placed at a level higher than latex container 1 and connected thereto by means of tubes 41 and 42. The latter tube is provided with a valve 43 which permits interrupting the flow of latex from reservoir 40 to container 1.

Based upon the foregoing description it is now possible to explain the operation of the apparatus through the various phases of the production of rubber tubing from latex.

At the beginning of the operation both the latex distributor 6 and the hot air blower 24 operatively engage the two ends of the bundle of tube forms 7 and the two air tubes 29 and 29' are inflated in order to hermetically close the slits affording communication from the interior of the apparatus to the outside. Valve 43 is closed and the level in containers 1 and 40 corresponds to that indicated in Fig. 1, the latex having been previously introduced through inlets 44 and 45.

A source of compressed air is placed in communication with container 1 through pressure limiting or relief valve 9 and three-way valve 8. The compressed air gradually forces the latex through flexible pipe 5 and distributor 6 into tube forms 7 until it reaches level A—A'.

The latex is then discharged from the tube forms, the three-way valve 8 being controlled to cut off the flow of compressed air into the latex container and establish communication between the latter and the atmospheric air. After this, the air tube 29 is deflated so as to free the slits 20 and 21 and the fan 25 is set in motion to send hot air into the tube forms 7 for drying the moist deposit of latex. The hot air passing through the tube forms 7 discharges through the slits 20 and 21.

During the drying operations it may be also advantageous to apply heat to the outside surfaces of the tube forms by causing a hot fluid to circulate through space 12.

The latex discharged from the tube forms, upon being returned to container 1 no longer reaches the original level corresponding to the lower end of tube 41 and it is, therefore, possible to admit atmospheric air to reservoir 40 through said tube 41. Valve 43 is opened and as a result a part of the latex contained in reservoir 40, equal to the amount of latex deposited in the tube forms, descends by gravity into container 1 until the latex level therein has again reached the lower end of tube 41 obstructing the opening thereof. The depression created in the upper part of reservoir 40 produces suction to draw latex into tube 41 up to the height corresponding to the latex level in reservoir 40. The depression is, therefore, proportional to the difference H, between the constant level of latex in container 1, when the latter is in communication with the atmospheric air, and the level of reservoir 40 which diminishes progressively as a result of latex being deposited in the tube forms. The latex which had risen in tube 41 is then forced into reservoir 40 when the three-way valve 8 establishes communication between container 1 and the source of compressed air, since the pressure of the compressed air introduced into container 1 is greater than that of the air present in reservoir 40. In this way tube 41 is freed of latex and put in condition to allow the passage of air during the phase in which the level in container 1 is brought to its original height. By this expedient it is possible to have automatically always the same level in container 1 at the beginning of each feeding of latex to the forms, and to note the progressive consumption of latex and the exhaustion thereof from the level in reservoir 40 which could advantageously be made of a transparent material.

When the layer of latex deposited on the interior surfaces of the tube forms has dried and the level of the latex in container 1 has automatically returned to normal, the fan 25 is cut off, the air tube 29 is again inflated, valve 43 closed and three-way valve 8 controlled to again permit the passage of compressed air. Under these conditions, latex is again introduced into the tube forms and the same procedure is repeated. When the level in reservoir 40 corresponds to half of the liquid contemplated for use in the operation, the two air tubes 29 and 29' are deflated, funnel 6 of the latex distributor and funnel 24 of the air blower are disengaged from the bundle of tube forms, and the latter is caused to be inverted or turned 180° about horizontal axis O—O'. After the two funnels are again applied to the bundle of tube forms and the air tubes 29 and 29' inflated, the cycles just described are repeated with the forms in inverted positions in order to obtain a constant thickness for the entire length of the tubes.

Figure 3:
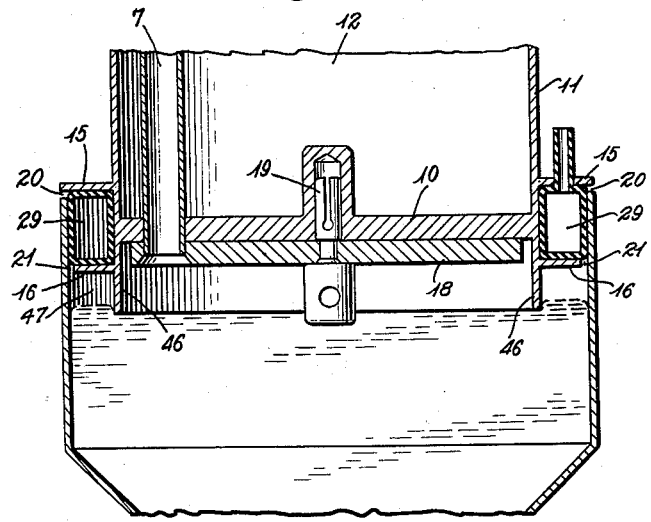
Fig. 3 shows in section a detail of the lower part of the bundle of tube forms and the connection between the forms and the latex distributor when the air tube serving to render said connection air-tight is inflated.
Figure 4:
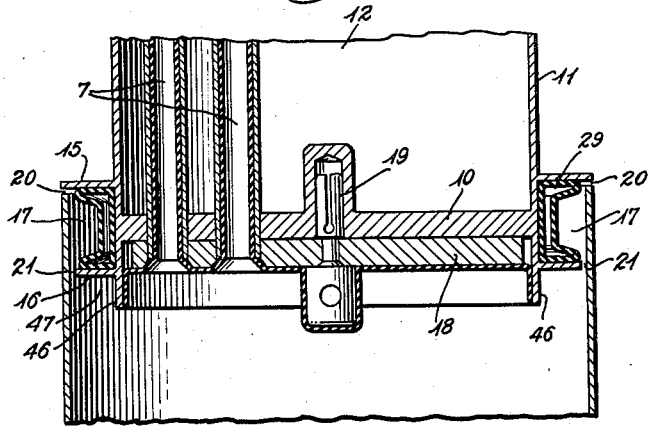
Fig. 4 shows in section a detail of the lower part of the bundle of tube forms and the connection between the forms and the latex distributor after latex deposition phase and while the air tube is deflated and the interior of the apparatus is, therefore, in communication with the outside atmosphere.

The factors which combine to effect the discharge of the hot air through slits 20 and 21, as well as the separation of the latex distributor 6 from the lower part of tube bundle 7, are explained as follows. The presence of edging 46 (Figures 3 and 4) associated with the housing that encloses the bundle of tube forms, provides an annular groove 47 closed at the top by packing 29, wherein air remains trapped which, although slightly reduced in its volume by the action of the latex rising in the distributor for discharge into the forms, prevents the latex from being deposited upon the parts that define cavity 47, and thereby wetting packing 29 and obstructing slit 21, which results in facilitating the separation of the distributor from the tube bundle when the latter must be rotated and the discharge of hot air during the drying operation.

Upon completing the cycle of latex depositions and relative drying procedures, the tubes are vulcanized by circulating a hot fluid, for example steam, through space 12 around all tube forms 7, or by passing hot air or steam through the interior thereof.

After the vulcanization, the air chambers 29 and 29' are deflated and the bundle of tube forms 7 are rotated until one of its ends engages the open end of the tubular body 30 of the dusting and extracting device (Figure 2) which was previously provided with nozzle 38. On the other end of the bundle of tube forms is applied cap 39 and the air tubes 29 and 29' are inflated thereby effectively sealing the system.

The fan 34 is then set in motion and by introducing talc through opening 37 there is created a circulation of talc laden air traveling in the direction of the arrows following the following path: Tube 36, tubular body 30, nozzle 38, central tube forms 7, cover 39, peripheral tube forms 7, space 48 and tube 35.

In this manner, it is possible to effect the dusting of the central tubes when air is passing toward cap 39 and of peripheral ones when air is passing toward space 48.

Upon completing the interior dusting, the nozzle 38 is removed, thus disengaging the bundle of tube forms 7 from the dusting and extracting device. The bundle of the tube forms is then returned to the position which it occupied during the interior dusting operation and plate 18 is attached to carriage 31. At this time plate 18 is uncoupled from terminal plate 10 by removing pin 19 (Fig. 5).

By driving winch 33 to take up cable 32, plate 18 and the end of the tubes, fastened together by the continuous deposition of latex on the inner surfaces of its openings and frontal surfaces dring the periods when the plate is immersed in latex, are pulled in the direction of the winch 33. This action has the effect of separating the rubber tubes from the forms, and causing the elastic extension and partial extraction of the rubber tubes from inside of the tube forms 7 and their introduction into the interior of tubtular body 30 wherein is circulated, by means of fan 34, air laden with talc which follows the path indicated by the arrows (Fig. 5). This accomplishes the dusting of the external surface of the part of the tubes that is extended outside of the tube forms.

When the carriage has reached the bottom of tubular body 30, it returns to its original position and the tubes elastically re-enter the inside of the tube forms 7. The identical operation is repeated at the other end after rotating the bundle of tube forms 180° about the axis O—O'. The outside dusting of the tubes is thus completed.

Figure 6:
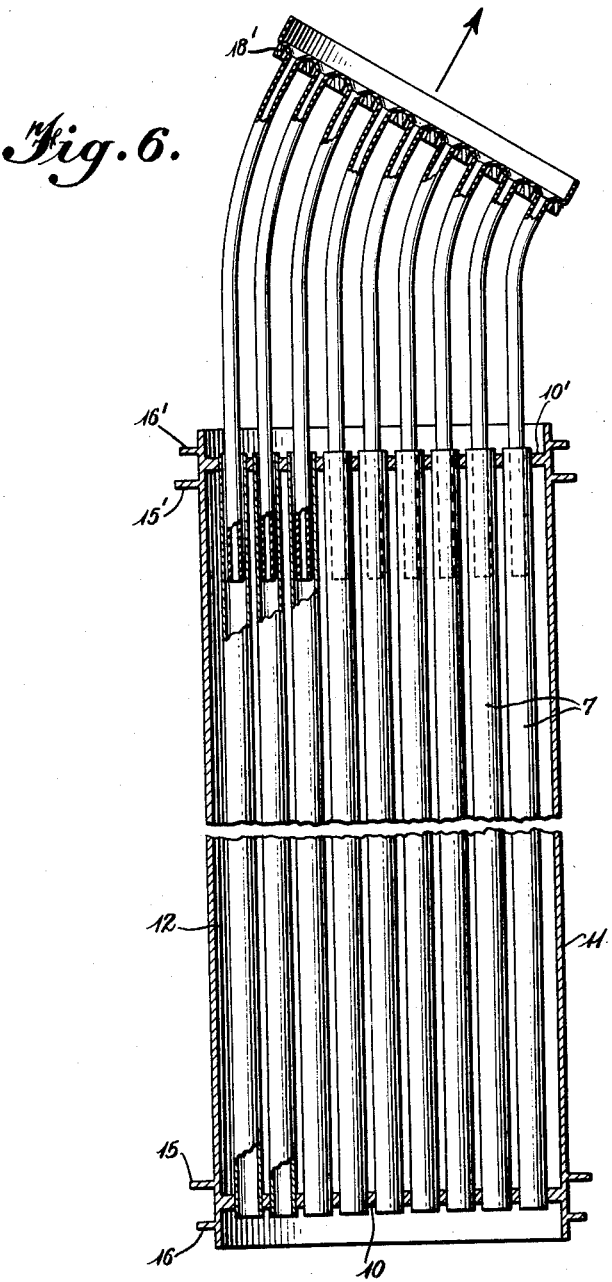
Fig. 6 illustrates the final operation of extracting the tubes from the forms.

For the final stripping of the tubes (Fig. 6), cover 39 is removed and the tubes are separated from the corresponding extraction plate 18 by cutting them flush therewith. This makes it possible to simultaneously withdraw all the tubes by moving the other plate 18' away from the bundle of tube forms.

It is possible to use several means for automatically carrying out the various operations described. These means, however, are not included in the present invention since they have been previously employed.

Some of the means which lend themselves to the operations described are briefly summarized.

The mechanical movements of the funnels and the rotation of the bundle may be easily carried out by means of pneumatic pistons that are remote controlled through conduits of small caliber and three-way electric valves.

The inflation and deflation of the pneumatic seals as well as the introduction and discharge of compressed air from container 1 for raising and lowering the latex may be controlled in analogous fashion.

The manner in which level A—A' is exactly arrived at, as well as the return of the latex to its original level corresponding to the lower extremity of tube 41, may be controlled by a mercury pressure gauge having electrical contacts. Finally, it is also possible to control the depression existing in the upper part of feed reservoir 40 and, consequently, the consumption of latex, since the depression is proportional to the difference between the constant level of latex in cointainer 1 and the variable level in reservoir 40.

It is, of course, obvious that in the absence of enclosure 11, seats 17 and 17', and the annular groove 47 could be replaced by equivalent means directly associated with terminal plates 10 and 10', without departing from the spirit and scope of the invention.

Although the present invention has been shown and described with reference to specific steps and apparatus, nevertheless, changes and modifications obvious to one skilled in the art are within the contemplation of the invention.

What is claimed is:

1. A method for the production of a tubular article from latex which includes the steps of introducing latex under pressure into the interior of a hollow form, discharging from said form the undeposited latex, drying the deposited layer of latex by passing a hot gaseous current through the form at a velocity insufficient to modify the evenness of the deposited layer but strong enough to rupture the air bubbles formed therein, vulcanizing the deposited layer by heating, dusting the interior surface of the resulting tubular article by passing a gaseous current laden with talc through the interior thereof to prevent the interior wall portions of the tubular article from adhering together when in contact, dusting the outside of the tubular article by resiliently extending it from the form into a zone wherein a gaseous current containing talc is being circulated, and removing the tubular article from the form by applying an extracting force at one of the ends thereof.

2. A method for the production of a tubular article from latex which includes the steps of introducing latex under pressure into the interior of a hollow form, discharging undeposited latex from said form, drying the deposited layer of latex, vulcanizing the deposited layer, dusting the interior surface of the resulting tubular article to prevent the interior wall portions of the tubular article from adhering together when in contact, dusting the outside of said tubular article by resiliently extending it from the form in order to make its external surface available for treatment, and removing the tubular article from the form.

References Cited in the file of this patent
UNITED STATES PATENTS

| | | |
|---|---|---|
| 1,542,388 | Hopkinson et al. | June 16, 1925 |
| 1,797,580 | Hopkinson et al. | Mar. 24, 1931 |
| 1,805,245 | Hopkinson et al. | May 12, 1931 |
| 1,949,502 | Szegvari | Mar. 6, 1934 |
| 2,161,281 | Carter | June 6, 1939 |
| 2,169,475 | Spanel | Aug. 15, 1939 |
| 2,238,443 | Fields | Apr. 15, 1941 |
| 2,362,653 | McGovern | Nov. 14, 1944 |
| 2,668,323 | Johnson | Feb. 9, 1954 |
| 2,696,642 | Kohrn | Dec. 14, 1954 |
| 2,735,138 | Luehm et al. | Feb. 21, 1956 |